(12) United States Patent
Colson

(10) Patent No.: US 11,571,745 B2
(45) Date of Patent: Feb. 7, 2023

(54) HEAT EXCHANGE STRUCTURES AND METHODS OF EXCHANGING HEAT BETWEEN FLUID FLOWS IN HEAT EXCHANGE STRUCTURES

(71) Applicant: Hamilton Sundstrand Corporation, Charlotte, NC (US)

(72) Inventor: Paul M. Colson, Westfield, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 397 days.

(21) Appl. No.: 16/811,254

(22) Filed: Mar. 6, 2020

(65) Prior Publication Data
US 2021/0276087 A1  Sep. 9, 2021

(51) Int. Cl.
| | |
|---|---|
| *B22F 10/00* | (2021.01) |
| *F28D 1/03* | (2006.01) |
| *F28D 1/053* | (2006.01) |
| *F28D 7/00* | (2006.01) |
| *F28F 7/02* | (2006.01) |
| *B33Y 10/00* | (2015.01) |
| *B33Y 30/00* | (2015.01) |

(Continued)

(52) U.S. Cl.
CPC .............. *B22F 10/00* (2021.01); *F28D 1/035* (2013.01); *F28D 1/0341* (2013.01); *F28D 1/0383* (2013.01); *F28D 1/05391* (2013.01); *F28D 7/005* (2013.01); *F28F 7/02* (2013.01); *B33Y 10/00* (2014.12); *B33Y 30/00* (2014.12); *B33Y 80/00* (2014.12); *F28D 2001/0273* (2013.01); *F28D 2021/0021* (2013.01); *F28D 2021/0026* (2013.01)

(58) Field of Classification Search
CPC ........ B22F 10/00; F28D 1/0341; F28D 1/035; F28D 1/0383; F28D 1/05391; F28D 7/005; F28D 2001/0273; F28D 2021/0021; F28D 2021/0026; F28D 9/0043; F28D 9/005; F28D 9/0056; F28D 9/0075; F28F 7/02; F28F 3/086; B33Y 10/00; B33Y 30/00; B33Y 80/00
USPC ................................ 165/167, 164, 165, 166
See application file for complete search history.

(56) References Cited

U.S. PATENT DOCUMENTS 2,864,404 A * 12/1958 Bruegger ................ F28D 7/106
165/70
4,210,199 A 7/1980 Doucette et al.
(Continued)

FOREIGN PATENT DOCUMENTS

| FR | 2603693 A1 | 3/1988 |
|---|---|---|
| WO | 8400415 | 2/1984 |

OTHER PUBLICATIONS

European Search Report for Application No. 21161229.6, dated Aug. 5, 2021, 66 pages.

*Primary Examiner* — Justin M Jonaitis
(74) *Attorney, Agent, or Firm* — Cantor Colburn LLP

(57) ABSTRACT

A heat exchange structure includes a primary heat exchange body with a first fluid channel fluidly separated from a second fluid channel by a barrier channel, an inlet manifold in fluid communication with the first fluid channel, and a secondary heat exchange body. The secondary heat exchange body is in fluid communication with the barrier channel, is arranged within the inlet manifold, and fluidly couples the barrier channel to the external environment. Fluid systems and heat exchange methods are also described.

12 Claims, 7 Drawing Sheets

(51) Int. Cl.
*B33Y 80/00* (2015.01)
*F28D 1/02* (2006.01)
*F28D 21/00* (2006.01)

(56) References Cited

U.S. PATENT DOCUMENTS

| | | | | |
|---|---|---|---|---|
| 4,972,902 A | * | 11/1990 | Ninomiya | F28F 1/003 165/70 |
| 5,182,019 A | * | 1/1993 | Cote | B01D 63/021 210/321.89 |
| 10,175,003 B2 | * | 1/2019 | Sennoun | F28F 7/02 |
| 2016/0369698 A1 | * | 12/2016 | Army, Jr. | F28D 9/0062 |

* cited by examiner

HEAT EXCHANGE STRUCTURES AND METHODS OF EXCHANGING HEAT BETWEEN FLUID FLOWS IN HEAT EXCHANGE STRUCTURES

BACKGROUND

The present disclosure is generally related to fluid systems, and more particularly to exchanging heat between fluid flows using heat exchange structures in fluid systems.

Heat exchangers, such as in fluid systems employing fuel to cool hot engine structure in gas turbine engines, are commonly employed to communicate heat between hot and cold fluid flows traversing the heat exchanger. The heat exchanger generally fluidly separates the hot fluid flow from the cold fluid flow with the mechanical structure of the heat exchanger. Separating the hot fluid flow from the cold fluid flow within the mechanical structure of the heat exchanger prevents intermixing of the hot and cold fluids.

In some heat exchangers the hot and cold fluid flows can be potentially reactive and/or combustible. In such heat exchangers a leakage space can be employed to provide additional separation between the hot and cold fluid flows within the heat exchanger. When employed, such leakage spaces are generally sealed such that leaked fluid is impounded within the heat exchanger in the event that a leak develops within the mechanical structure of the heat exchanger. The leakage space may be evacuated or contain a charge of inert gas to prevent reaction and/or combustion of leakage fluid with the atmosphere of the leakage space and within the heat exchanger. Telltale devices, such as sight glasses and/or pressure gauges, can communicate with the leakage space to provide indication of leakage and prompt replacement of the heat exchanger in the event an internal leak develops.

Such systems and methods have generally been acceptable for their intended purpose. However, there remains a need for improved heat exchange structures, fluid systems including heat exchange structures, and methods of exchanging heat between fluid flows within heat exchange structures.

BRIEF DESCRIPTION

A heat exchange structure is provided. The heat exchange structure includes a primary heat exchange body with a first fluid channel fluidly separated from a second fluid channel by a barrier channel, an inlet manifold in fluid communication with the second fluid channel, and a secondary heat exchange body. The secondary heat exchange body is in fluid communication with the barrier channel, is arranged within the inlet manifold, and fluidly couples the barrier channel to an external environment outside the heat exchange structure.

In addition to one or more of the features described above, or as an alternative, further examples of the heat exchange structure may include that the secondary heat exchange body has a vent fluidly coupling the barrier channel to the external environment.

In addition to one or more of the features described above, or as an alternative, further examples of the heat exchange structure may include that the secondary heat exchange body has a conduit portion with two or more conduit turns, and that the conduit portion of the secondary heat exchange body is arranged within the inlet manifold.

In addition to one or more of the features described above, or as an alternative, further examples of the heat exchange structure may include that the secondary heat exchange body includes a header portion connected to the primary heat exchange body and fluidly coupling the barrier channel to the secondary heat exchange body.

In addition to one or more of the features described above, or as an alternative, further examples of the heat exchange structure may include that the barrier channel is unsealed with respect to the external environment and is in fluid communication with the external environment through a vent, and that the heat exchange structure also includes a collection tank in fluid communication with the barrier channel.

In addition to one or more of the features described above, or as an alternative, further examples of the heat exchange structure may include that the primary heat exchange body includes an outer wall portion bounding the first fluid channel, and that the first fluid channel has two or more first fluid channel segments.

In addition to one or more of the features described above, or as an alternative, further examples of the heat exchange structure may include that the primary heat exchange body includes an intermediate wall portion bounding the barrier channel, and that the barrier channel has two or more barrier channel segments interleaved among the two or more first fluid channel segments.

In addition to one or more of the features described above, or as an alternative, further examples of the heat exchange structure may include that the primary heat exchange body includes an inner wall portion bounding the barrier channel and the second fluid channel, and that the second fluid channel has two or more second fluid channel segments interleaved among the two or more first fluid channel segments and is thermally coupled to the first fluid channel by the barrier channel.

In addition to one or more of the features described above, or as an alternative, further examples of the heat exchange structure may include a first fluid source fluidly coupled to the heat exchange structure by a heat source.

In addition to one or more of the features described above, or as an alternative, further examples of the heat exchange structure may include that the heat source includes hot engine structure in a gas turbine engine.

In addition to one or more of the features described above, or as an alternative, further examples of the heat exchange structure may include that the first fluid source is a fuel source, and that a heated fuel flow traverses the first fluid channel.

In addition to one or more of the features described above, or as an alternative, further examples of the heat exchange structure may include that the heated fuel flow has a temperature that is greater than an auto-ignition temperature of fuel within the heated fuel flow.

In addition to one or more of the features described above, or as an alternative, further examples of the heat exchange structure may include a leakage flow including fuel flowing from the first fluid channel to the secondary heat exchange body through the barrier channel, and a second fluid flow including an oxidizer traversing the second fluid channel of the primary heat exchange body and/or resident within the barrier channel.

In addition to one or more of the features described above, or as an alternative, further examples of the heat exchange structure may include one or more of (a) a heat transfer enhancement feature connected to the secondary heat exchange structure and thermally coupling the secondary heat exchange structure to fluid traversing the inlet manifold, and (b) a leakage flow sensor arranged within the inlet manifold and in communication with the second heat transfer structure.

A fluid system is also provided. The fluid system includes a heat exchange structure as described above and the secondary heat exchange body has vent fluidly coupling the barrier channel to the external environment. A heated fuel flow traverses the first fluid channel and an oxidizer flow traverses the second fluid channel.

In addition to one or more of the features described above, or as an alternative, further examples of the fluid system may include a heat source including hot engine structure in a gas turbine engine, and that the barrier channel is unsealed with respect to the external environment.

In addition to one or more of the features described above, or as an alternative, further examples of the fluid system may include that the inner wall portion is arranged within the primary heat exchange body and bounds the first fluid channel, that the fluid system further includes an intermediate wall portion arranged within the primary heat exchange body and bounding the barrier channel and an outer wall portion arranged within the primary heat exchange body bounding the second fluid channel, and that the primary heat exchange body and the secondary heat exchange body formed as a solid one-piece body of homogenous composition using an additive manufacturing technique.

A heat exchange method is additionally provided. The method includes, at a heat exchange structure as described above, flowing a hot fluid flow through the first fluid channel, receiving a cold fluid flow at the inlet manifold, and cooling the secondary heat exchange body with the cold fluid flow. The cold fluid is flowed to the second fluid channel and heat is communicated from the hot fluid flow to the cold fluid flow through the barrier channel.

In addition to one or more of the features described above, or as an alternative, further examples of the method may include leaking a hot leakage flow from the first fluid channel into the barrier channel, cooling the hot leakage flow with the secondary heat exchange body, and venting the cooled leakage flow to the external environment through the secondary heat exchange body.

In addition to one or more of the features described above, or as an alternative, further examples of the method may include that the hot fluid flow includes a fuel, that the fuel has a temperature that is greater than an auto-ignition temperature of the fuel, that the cold fluid flow includes an oxidizer, and that the barrier channel and an interior of the secondary heat exchange body are maintained at ambient pressure.

Technical effects of the present disclosure include heat exchange structures having the capability to exchange heat between hot and cold fluid flows when one of the fluid flows includes a reactive fluid having temperature greater than the auto-ignition temperature of the fluid without sealing a barrier cavity separating the hot fluid flow from the cold fluid flow, limiting weight and/or complexity of the heat exchange structure. Technical effects of the present disclosure also include heat exchange structures having relatively small volume and weight as the barrier cavity is not required to accommodate the flow pressure of either (or both) the fluid flows. Technical effects additionally include heat exchange structures having relatively small flow fluid volumes in relation to multiple heat exchanger arrangements, simplifying incorporation of the heat exchange structure in vehicles such as aircraft.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
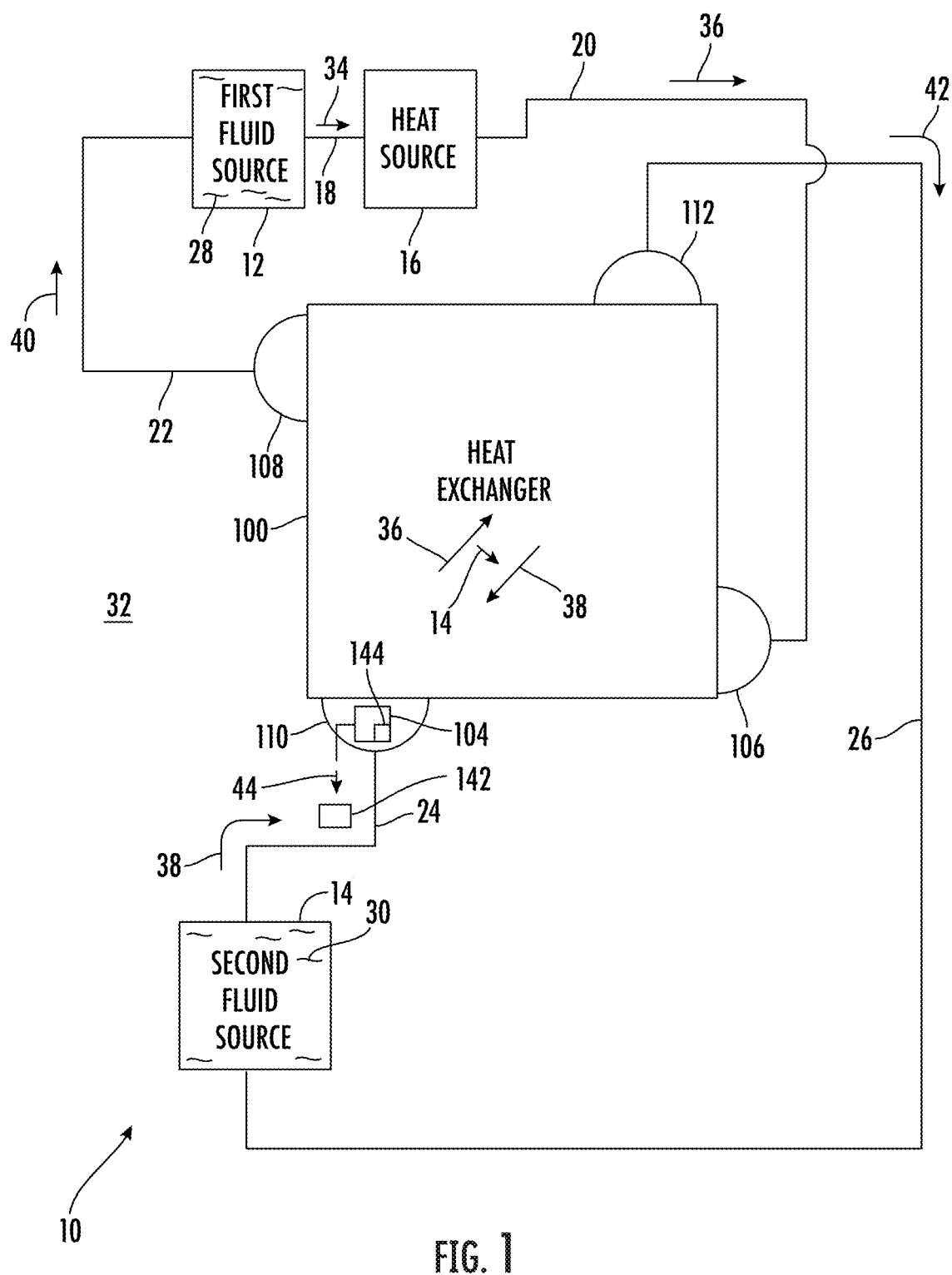
FIG. 1 is a schematic view of a heat exchange structure constructed in accordance with present disclosure, showing the heat exchange structure communicating heat between a first fluid flow and a second fluid flow to cool a heat source.

Reference will now be made to the drawings wherein like reference numerals identify similar structural features or aspects of the subject disclosure. For purposes of explanation and illustration, and not limitation, a partial view of an example of a heat exchange structure in accordance with the disclosure is shown in FIG. 1 and is designated generally by reference character 100. Other examples of heat exchange structures, fluid systems having heat exchange structures, and heat exchange methods are provided in FIGS. 2-7, as will be described. The systems and methods described herein can be used in fluid systems employing reactive or combustible fluids as heat transfer mediums, such as fuel employed in gas turbine engines to remove heat from hot engine structures, though the present disclosure is not limited to gas turbine engines or to any particular heat transfer medium in general.

Referring to FIG. 1, a fluid system 10, e.g., a fuel system for a gas turbine engine, is shown. The fluid system 10 includes the heat exchange structure 100, a first fluid source 12, and a second fluid source 14. The fluid system 10 also includes a heat source 16, a first fluid supply conduit 18, a heat exchange structure first fluid supply conduit 20, and a first fluid return conduit 22. The fluid system 10 additionally includes a second fluid supply conduit 24 and a second fluid return conduit 26.

The first fluid source 12 contains a first fluid 28. In certain examples the first fluid 28 includes a reactive fluid, e.g., a fluid that is potentially combustible (or explosive) when intermixed with another fluid (e.g., an oxidizer). In accordance with certain examples the first fluid 28 includes a fuel with an auto-ignition temperature, such a kerosene-based fuel like JP-8, the first fluid source being a fuel source arranged to communicate a heated fuel flow. It is contemplated that the fluid system 10 can be a fuel system, e.g., a fuel system for a gas turbine engine. However, although shown and described herein in the context of a fuel system for gas turbine engine, it is to be understood and appreciated that other types of fluid systems can also benefit from the present disclosure.

The first fluid supply conduit 18 fluidly couples the first fluid source 12 to the heat source 16. The heat exchange structure first fluid supply conduit 20 fluidly couples the heat source 16 to the heat exchange structure 100. The heat exchange structure 100 fluidly couples the heat exchange structure first fluid supply conduit 20 to the first fluid return conduit 22, and further thermally couples the heat source 16 to the second fluid source 14 through the structure of the heat exchange structure 100 and without fluid communication between the first fluid source 12 and the second fluid source 14 within the heat exchange structure 100. The first fluid return conduit 22 in turn fluidly couples the heat exchange structure 100 to the first fluid source 12.

The second fluid source 14 includes a second fluid 30. In certain examples the second fluid 30 includes an oxidizer arranged to provide an oxidizer flow. In accordance with certain examples the second fluid 30 includes oxygen. It is contemplated that, in accordance with certain examples, the second fluid includes air and/or is an airflow, e.g., an airflow from the external environment 32 outside the heat exchange structure 100. It is also contemplated that the second fluid source 14 be a cold fluid source, the second fluid source 14 providing the second fluid 30 to the heat exchange structure 100 at a temperature below that of fluid provided by the first fluid source 12 via the heat source 16.

The second fluid supply conduit 24 fluidly couples the second fluid source 14 to the heat exchange structure 100. The heat exchange structure 100 in turn fluidly couples the second fluid supply conduit 24 to the second fluid return conduit 26, and the second fluid return conduit 26 fluidly couples the heat exchange structure 100 to the second fluid source 14. In certain examples the second fluid supply conduit 24 and/or the second fluid return conduit 26 can terminate at vents to the ambient environment, e.g., to the external environment 32 outside a vehicle, e.g., an aircraft, carrying the fluid system 10.

During operation the first fluid source 12 provides first fluid supply flow 34 to the heat source 16. The heat source 16 adds heat H to the first fluid supply flow 34 and communicates a heated first fluid supply flow 36, e.g., a hot fluid flow, to the heat exchange structure 100. The heat exchange structure 100 receives both the heated first fluid supply flow 36 and a second fluid supply flow 38 from the second fluid source 14 (e.g., a cold fluid flow), and transfers at least a portion of the heat H from the heated first fluid supply flow 36 to a second fluid supply flow 38. The heat exchange structure 100 thereafter communicates a cooled first fluid return flow 40 to the first fluid source 12 and a heated second fluid return flow 42 to the second fluid source 14.

Figure 2:
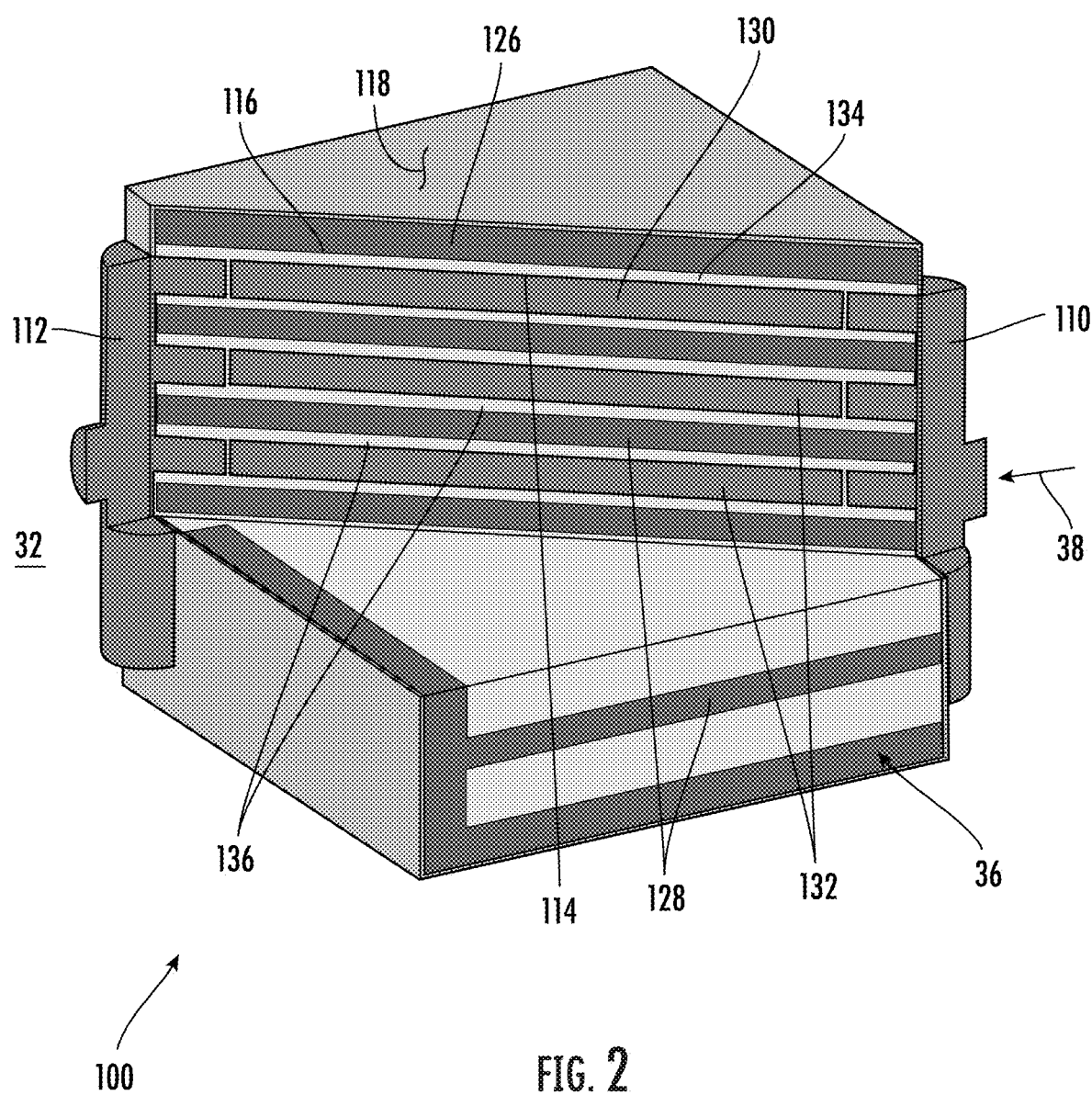
FIG. 2 is a partially sectioned perspective view of the heat exchange structure of FIG. 1 according to an example, showing a barrier channel (shown in yellow) fluidly isolating a first fluid channel (shown in red) from a second fluid channel (shown in blue) within a primary heat exchange body of the heat exchange structure.

With reference to FIG. 2, the heat exchange structure 100 is shown according to an example. The heat exchange structure 100 has a primary heat exchange body 102, a secondary heat exchange body 104 (shown in FIG. 1) and a first fluid inlet manifold 106 (shown in FIG. 1). The heat exchange structure 100 also has a first fluid outlet manifold 108 (shown in FIG. 1), a second fluid inlet manifold 110, and a second fluid outlet manifold 112. The primary heat exchange body 102 has an inner wall portion 114, an intermediate wall portion 116 and an outer wall portion 118. The secondary heat exchange body 104 has a header portion 120 (shown in FIG. 5), a conduit portion 122 (shown in FIG. 5) and a vent portion 124.

The outer wall portion 118 and the intermediate wall portion 116 bound a first fluid channel 126 within the primary heat exchange body 102. The first fluid channel 126 fluidly couples the first fluid inlet manifold 106 (shown in FIG. 1) to the first fluid outlet manifold 108 (shown in FIG. 1) to communicate the heated first fluid supply flow 36 through the primary heat exchange body 102. It is contemplated that the first fluid channel 126 include a plurality of first fluid channel segments 128, providing larger heat exchange area within the primary heat exchange body 102 than examples having a singular first fluid channel segment 128. In the illustrated example the first fluid channel 126 has six (6) first fluid channel segments 128 fluidly coupling the first fluid inlet manifold 106 to the first fluid outlet manifold 108. Although six (6) first fluid channel segments 128 are shown in the illustrated example it is to be understood and appreciated that the first fluid channel 126 can have fewer than or more than six (6) first fluid channel segments 128, as suitable for a given application.

Figure 3:
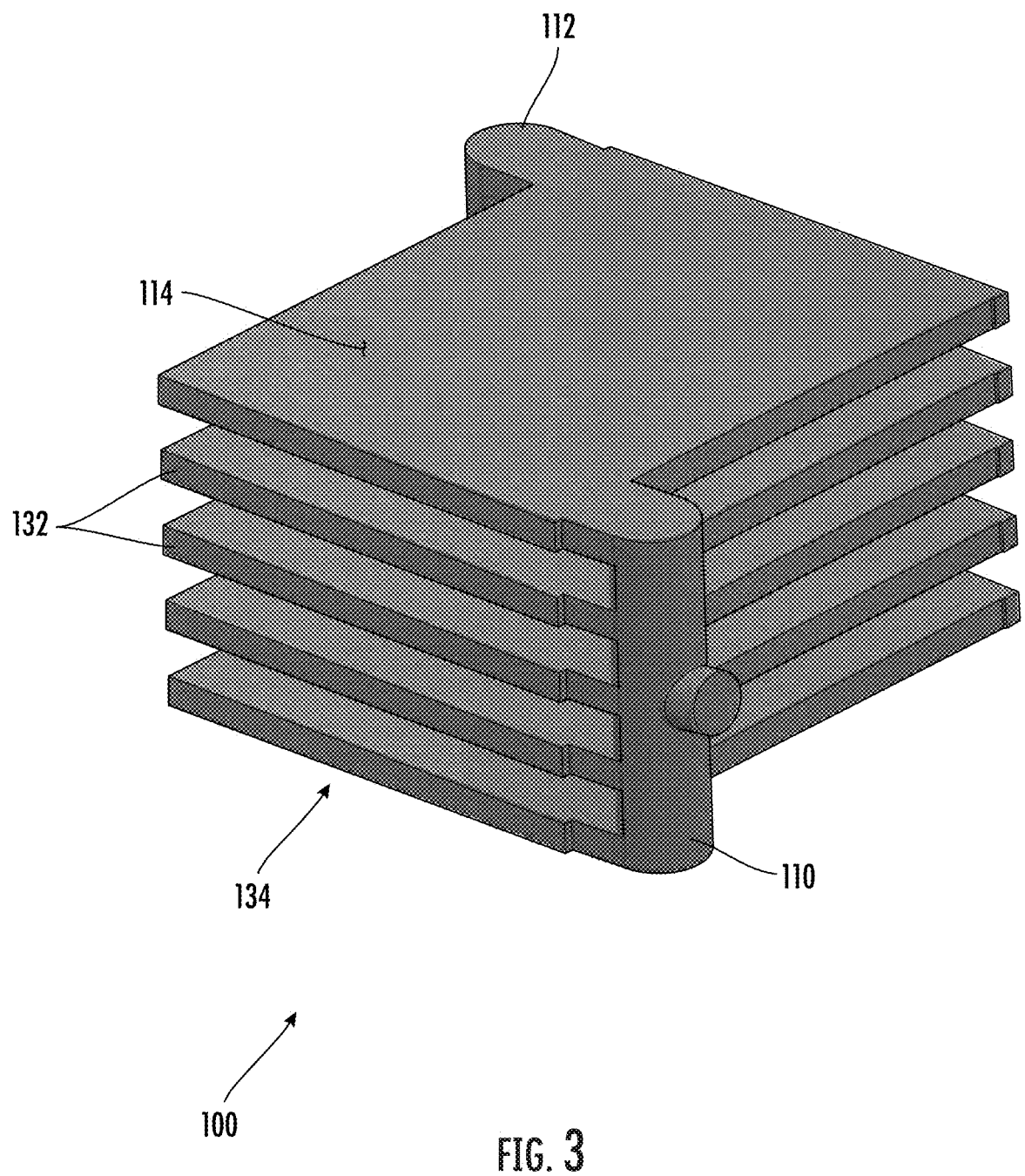
FIG. 3 is a schematic view of a portion of the heat exchange structure of FIG. 1 according to the example, showing the first fluid channel fluidly coupling a first fluid inlet manifold to a first fluid outlet manifold.

With reference to FIG. 3, the inner wall portion 114 bounds a second fluid channel 130 (shown in FIG. 2 and indicated generally in FIG. 3) within the primary heat exchange body 102. The second fluid channel 130 fluidly couples the second fluid inlet manifold 110 to the second fluid outlet manifold 112 to communicate the second fluid supply flow 38 through the primary heat exchange body 102. It is contemplated that the second fluid channel 130 include a plurality of second fluid channel segments 132, providing a larger heat exchange area within the primary heat exchange body 102 than examples having a singular second fluid channel segment 132. In the illustrated example the second fluid channel 130 has five (5) second fluid channel segments 132 fluidly coupling the second fluid inlet manifold 110 to the second fluid outlet manifold 112 each interleaved among (e.g., between) adjacent pairs of first fluid channel segments 128. Although five (5) second fluid channel segments 132 are shown in the illustrated example it is to be understood and appreciated that the second fluid channel 130 can have fewer than or more than five (5) second fluid channel segments 132, as suitable for a given application.

Figure 4:
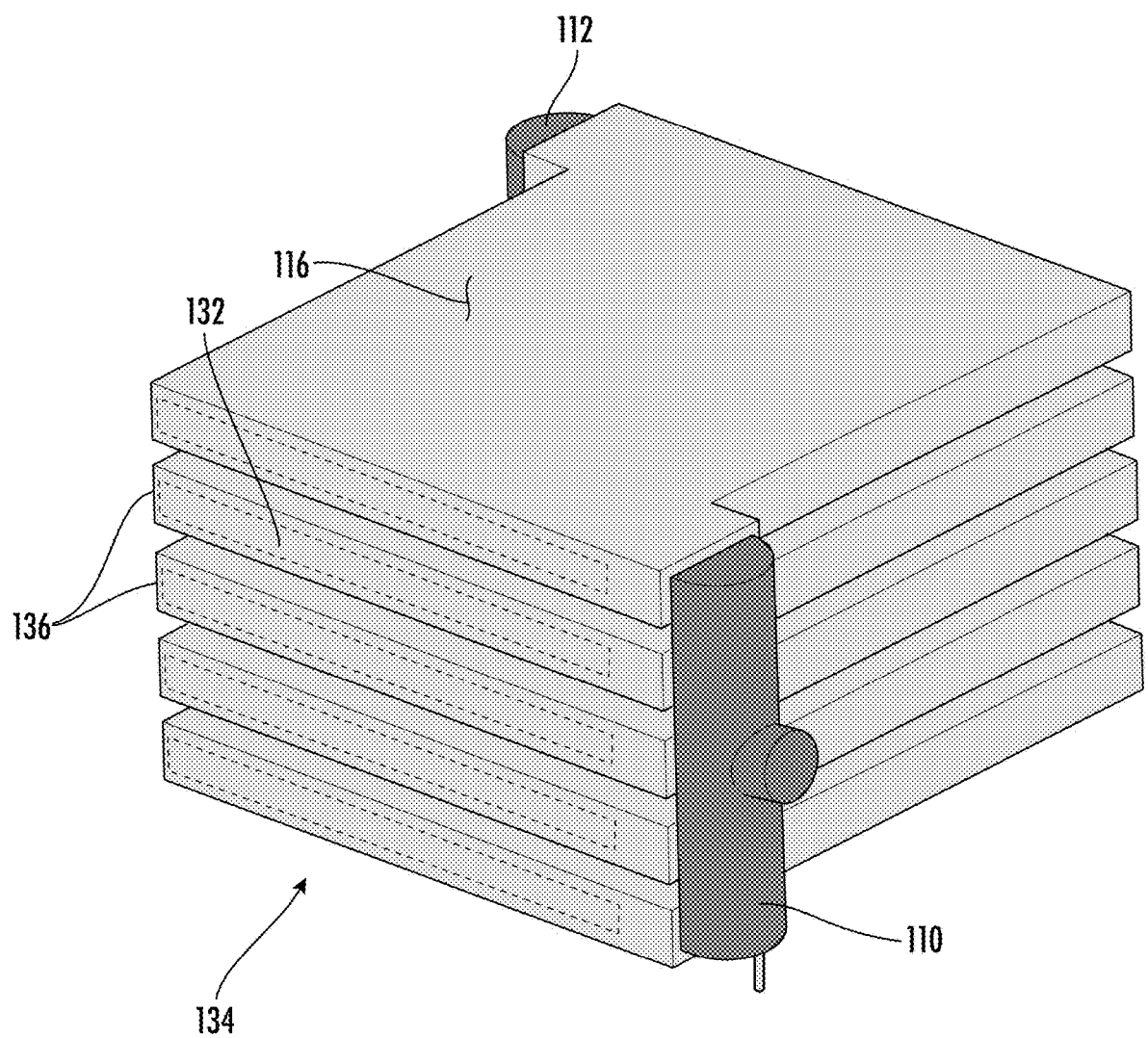
FIG. 4 is a schematic view of a portion of the heat exchange structure of FIG. 1 according to the example, showing the barrier cavity extending about the first fluid channel and fluidly coupled to a vent (shown in yellow) by a secondary heat exchange structure.

With reference to FIG. 4, the intermediate wall portion 116 and the and inner wall portion 114 (shown in FIG. 2) bound a barrier channel 134 (shown in FIG. 2 and indicated generally in FIG. 4). The barrier channel 134 fluidly separates the first fluid channel 126 from the second fluid channel 130, provide thermal communication for communication of the heat H (shown in FIG. 1) between the heated first fluid supply flow 36 (shown in FIG. 1) and the second fluid supply flow 38 (shown in FIG. 1) traversing the first fluid channel 126 and the second fluid channel 130, respectively. The barrier channel 134 is fluidly coupled to the secondary heat exchange body 104 and is in turn fluidly coupled by the secondary heat exchange body 104 to the external environment 32 to provide an egress path for the hot leakage flow 44 (shown in FIG. 2) from the primary heat exchange body 102.

It is contemplated that the barrier channel 134 include a plurality of barrier channel segments 136. The barrier channel segments 136 are interleaved between adjacent pairs of first fluid channel segments 128 (shown in FIG. 2) and second fluid channel segments 132 (shown in FIG. 2). The barrier channel segments 136 provide thermal communication and fluid separation between the first fluid channel segments 128 and the second fluid channel segments 132 in the event that a leak develops in one of the adjacent first fluid channel segments 128 and second fluid channel segments 132. Specifically, the first fluid channel 126 is fluidly separated from the second fluid channel 130 by the barrier channel 134. In the illustrated example the barrier channel 134 has five (5) barrier channel segments 136 each fluidly coupled to the secondary heat exchange body 104 and therethrough to the external environment 32. Although five (5) barrier channel segments 136 are shown in the illustrated example it is to be understood and appreciated that the barrier channel 134 can have fewer than or more than five (5) barrier channel segments 136, as suitable for a given application.

Figure 5:
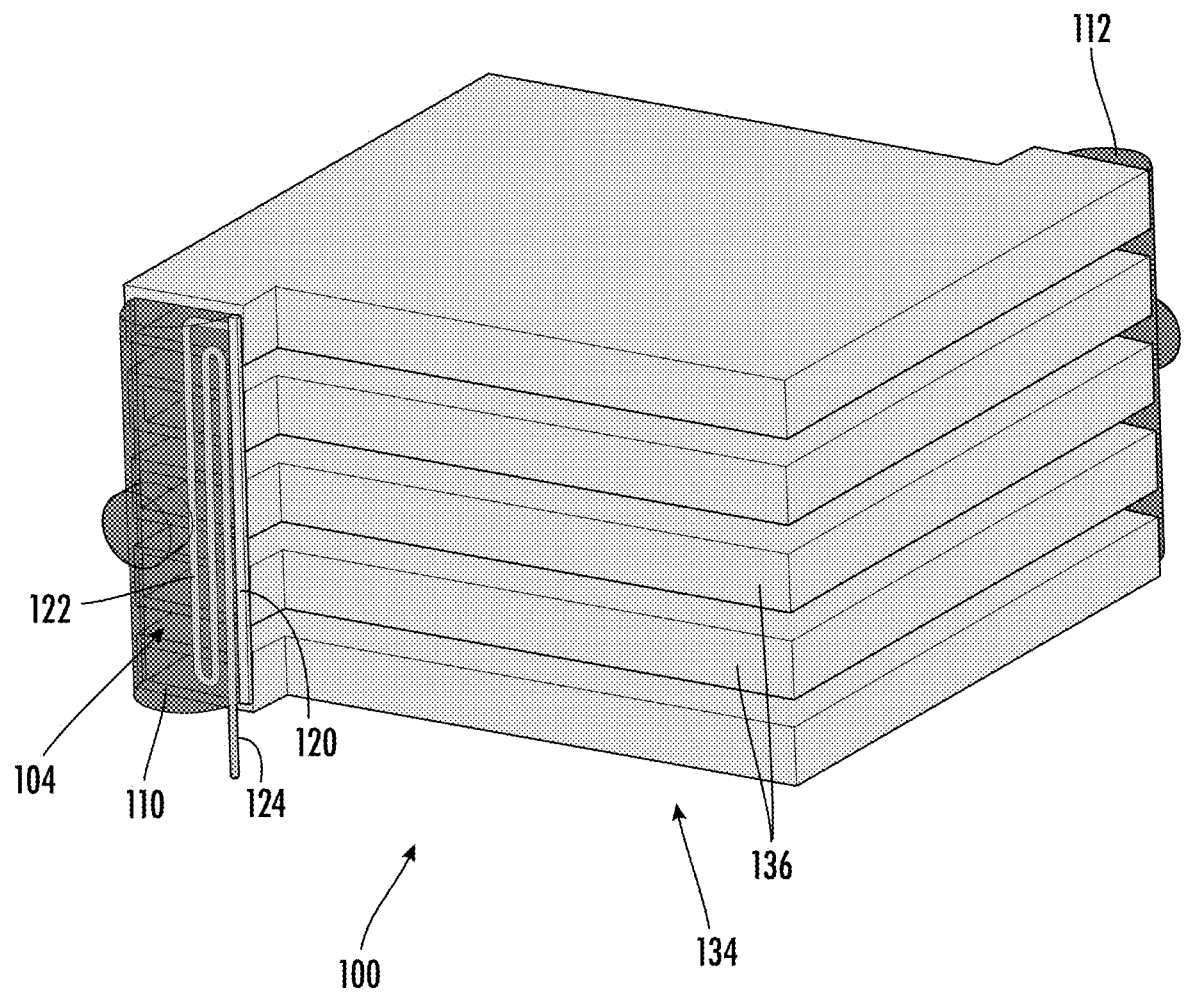
FIG. 5 is a schematic view of a portion of the heat exchange structure of FIG. 1 according to the example, showing the secondary heat exchange structure (shown in yellow) arranged within the first fluid inlet manifold and between the first fluid inlet and the first fluid channel.

With reference to FIG. 5, the secondary heat exchange body 104 defines a flow path fluidly coupling the barrier channel 134 to the external environment 32 through the header portion 120. In this respect the conduit portion 122 extends from the header portion 120 and the and the vent portion 124 extends from the conduit portion 122. The header portion 120 is connected to the primary heat exchange body 102, is in fluid communication with the barrier channel 134, and fluidly couples the barrier channel to the conduit portion 122 of the secondary heat exchange body 104. More specifically, the header portion 120 is in fluid communication with each of the barrier channel segments 136 and fluidly couples each of the barrier channel segments 136 of the barrier channel 134 to communicate leakage fluid, e.g., the hot leakage flow 44 (shown in FIG. 2), to the conduit portion 122 of the secondary heat exchange body 104.

Figure 6:
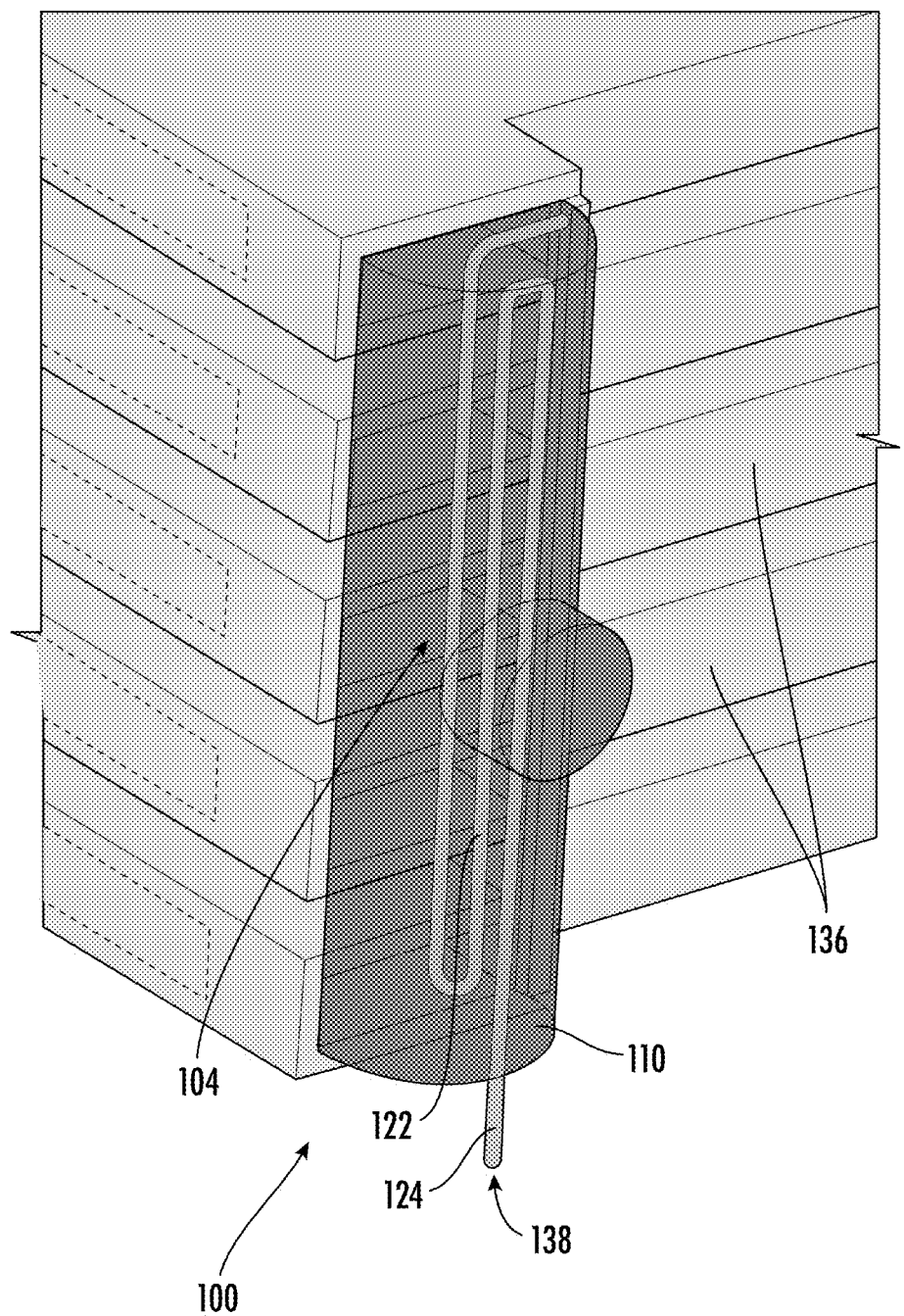
FIG. 6 is a schematic view of a portion of the heat exchange structure of FIG. 1 according to the example, showing a barrier cavity header fluidly coupling barrier channel segments of the barrier channel to the secondary heat exchange body.

With reference to FIG. 6, the conduit portion 122 of the secondary heat exchange body 104 is arranged within the second fluid inlet manifold 110, fluidly couples the header portion 120 to the vent portion 124, and thermally couples the leakage fluid, e.g., the hot leakage flow 44 (shown in FIG. 1), to the second fluid supply flow 38 (shown in FIG. 1) traversing the second fluid inlet manifold 110. In this respect the second fluid supply flow 38 traverses the exterior of the conduit portion 122 prior to entering the primary heat exchange body 102, the second fluid supply flow 38 thereby cooling the secondary heat exchange body 104 prior to receiving the heat H (shown in FIG. 1) from the heated first fluid supply flow 36 (shown in FIG. 1). As will be appreciated by those of skill in the art in view of the present disclosure, cooling the leakage fluid prior to exit from the heat exchange structure 100 allows the leakage fluid above its auto-ignition temperature within the first fluid channel 126 to be issued to the external environment 32 without risk of combustion upon contact with the external environment. It is contemplated that the conduit portion 122 include a plurality of conduit turns 140 located within the second fluid inlet manifold 110, the number of turns selected according to the cooling requirements of the second fluid 30 in the event a leak develops within the heat exchange structure 100.

The vent portion 124 is arranged outside of the second fluid inlet manifold 110 and fluidly couples the conduit portion 122 to the external environment 32 (shown in FIG. 1). It is contemplated that the vent portion 124 have a vent 138. The vent 138 provides fluid communication with the external environment 32 such that the secondary heat exchange body 104 (and therethrough the barrier channel 134) is unsealed (e.g., open) from the external environment 32. Being unsealed with respect to the external environment the barrier channel 134 remains at ambient pressure, limiting size and/or weight of the heat exchange structure 100.

With continuing reference to FIG. 2, in certain examples the vent portion 124 is in communication with a collection tank 142 (shown in FIG. 2) to collect leakage fluid from the barrier channel 134. In accordance with certain examples, a sensor 144 can be in communication with the secondary heat exchange body 104 for detecting leakage fluid issuing from the barrier channel 134. As will be appreciated by those of skill in the art, sensing leakage fluid with the sensor 144 allows the health of the heat exchange structure 100 to be monitored remotely and without the need to visually inspect the secondary heat exchange body 104 for signs of leakage fluid. It is also contemplated that the secondary heat exchange body 104 can be formed with a heat transfer enhancement feature 146, e.g., fins and/or additional channels, to increase heat transfer between leakage fluid traversing the secondary heat exchange body 104 and fluid traversing the second fluid inlet manifold 110 and/or limiting pressure drop of the fluid traversing the second fluid inlet manifold 110.

In certain examples the heat exchange structure 100 is formed using an additive manufacturing technique. In this respect at least the primary heat exchange body 102, the secondary heat exchange body 104, and the second fluid inlet manifold 110 are formed as a solid one-piece body of homogenous composition using an additive manufacturing technique. Use of an additive manufacturing technique can limit size and/or weight of the heat exchange structure 100. Use of an additive manufacturing technique can also facilitate fluid flow and heat communication through the heat exchange structure 100, e.g., by allowing the conduit portion 122 of the secondary heat exchange body 104 to be formed with a number of tuns within the second fluid inlet manifold 110 suitable for the intended application of the heat exchange structure 100. Examples of suitable additive manufacturing techniques include laser sintering and powder be fusion techniques.

Figure 7:
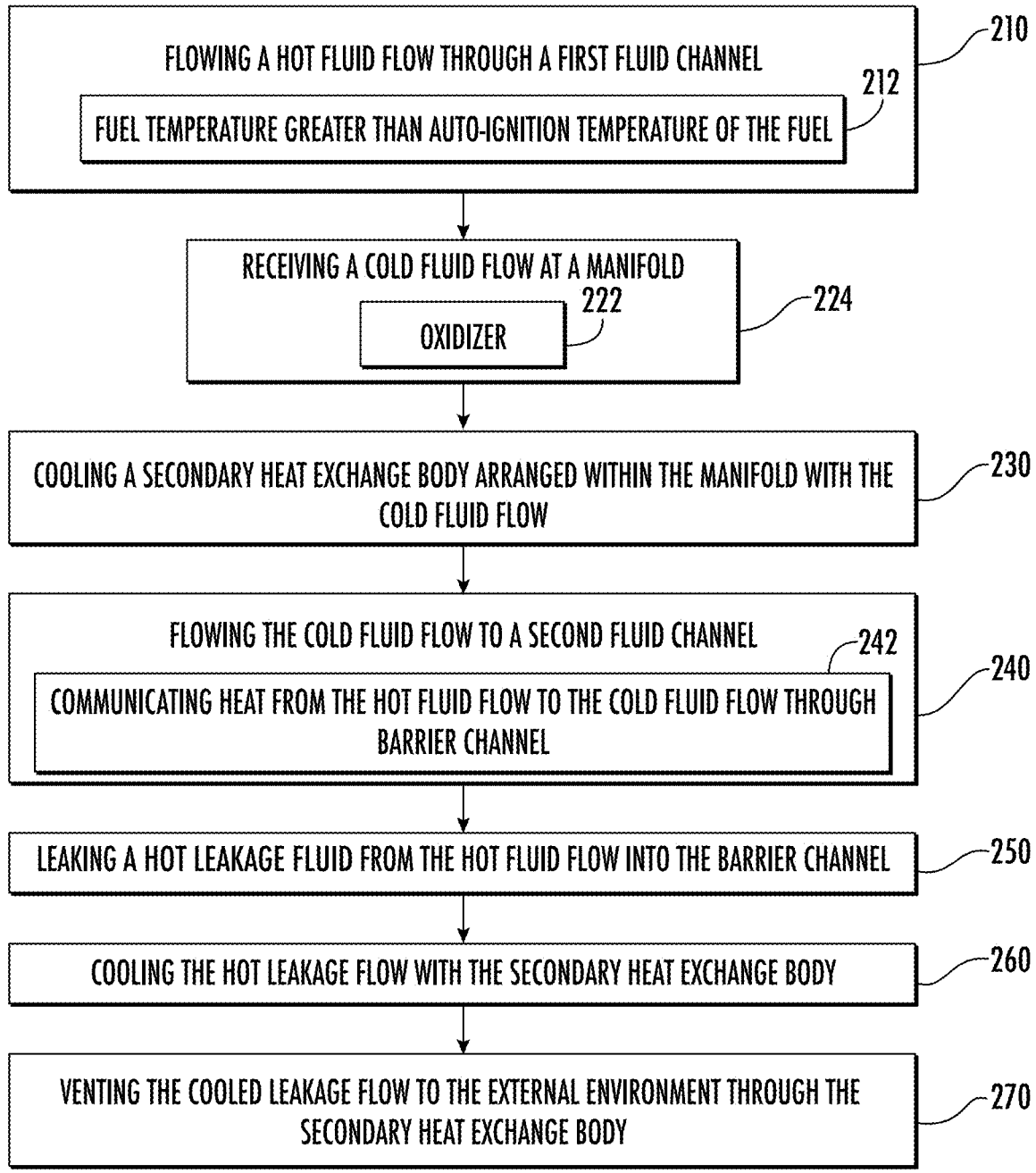
FIG. 7 is a block diagram of a heat exchange method according to the present disclosure, showing operations of the method according to an illustrative and non-limiting example of the method.

With reference to FIG. 7, a heat transfer method 200 is shown. As shown with box 210, the method 200 includes flowing a hot fluid flow through a first fluid channel, e.g., the heated first fluid supply flow 36 (shown in FIG. 1) through the first fluid channel 126 (shown in FIG. 2) of the heat exchange structure 100 (shown in FIG. 1). The method also includes receiving a cold fluid flow at an inlet manifold, e.g., the second fluid supply flow 38 (shown in FIG. 1) at the second fluid inlet manifold 110 (shown in FIG. 1), as shown with box 220. In certain examples the hot fluid flow includes a fuel, e.g., fuel within the first fluid 28 (shown in FIG. 1), as shown with box 212. In accordance with certain examples, the fuel can be at a temperature that is greater than an auto-ignition temperature of the fuel, as also shown with box 212. It is also contemplated that the second fluid flow includes an oxidizer, e.g., air, as shown with box 222.

As shown with box 230, the method 200 also includes receiving a cold fluid flow at the inlet manifold and flowing the cold fluid over a secondary heat exchange body arranged within the inlet manifold, e.g., the secondary heat exchange body 104 (shown in FIG. 1). The cold fluid flow is then communicated to a second fluid channel, e.g., the second fluid channel 130 (shown in FIG. 2), and heat communicated from the hot fluid flow to the cold fluid, as shown with boxes 230 and 240. It is contemplated that the heat be communicated within the primary heat exchange body between the hot fluid flow and the cold fluid flow through a barrier channel, e.g., the barrier channel 134 (shown in FIG. 1), as shown with box 242.

In certain examples the method 200 includes leaking a hot leakage flow from the hot fluid flow into the barrier channel, e.g., the hot leakage flow 44 (shown in FIG. 1), as shown with box 250. The hot leakage flow flows through the barrier channel to the secondary heat exchanger and the is cooled by the secondary heat exchange body, e.g., using the cold fluid flow traversing the inlet manifold, as shown with box 260. The cooled leakage flow is thereafter communicated (e.g., vented) to the external environment through the secondary heat exchange body via a vent or to a collected tank, as shown with box 270. It is contemplated that the barrier cavity and an interior of the secondary heat exchange body be maintained at ambient pressure during operations of the method 200.

Heat exchangers can employ barrier cavities to prevent intermixing of fluid flows traversing the heat exchanger in the event of leakage while communicating heat between the fluid flows. The barrier cavities can be vented to the external environment rather than sealed, allowing the heat exchanger to be monitored for leakage and facilitate replacement in the event a leak develops within the heat exchanger. Such vented barrier cavities are less useful in applications where one of the fluids is of temperatures sufficient to react with the ambient atmosphere, such as heat exchangers employed to convey fuel flows of temperatures greater than the auto-ignition temperature of the fuel.

In examples described herein, heat exchangers employ a primary heat exchange body with an integral second heat exchange body. The secondary heat exchange body fluidly couples a barrier channel within the primary heat exchange body to the external environment for cooling leakage fluid from within the primary heat exchange body to temperature that are below the auto-ignition temperature of the fluid prior to exiting the heat exchange structure. This allows the leakage flow to be communicated to the external environment, e.g., dumped overboard, with limited (if any) risk of ignition, fire, and/or explosion.

In certain examples the secondary heat exchange body is arranged within the heat exchange structure such that cool fluid entering the heat exchange structure traverses the exterior of secondary heat exchange body prior to entering the interior of the primary heat exchange body, e.g., within an inlet manifold of the heat exchanger structure. In accordance with certain examples the secondary heat exchange body is formed with the primary heat exchange body integrally, as a solid one-piece body of homogeneous composition via an additive manufacturing technique, limiting the size of the heat exchange structure and/or facilitating thermal and fluid performance of the heat exchange structure.

Technical effects of the present disclosure include the capability to exchange heat between fluid flows when one of the fluid flows includes a reactive fluid of temperature greater than the auto-ignition temperature of the fluid without sealing, limiting weight and/or complexity of the heat exchange structure. Technical effects of the present disclosure also include relatively small volume and weight as the barrier cavity is not required to accommodate the flow pressure of either (or both) the fluid flows. Technical effects additionally include relatively low fluid volumes in relation to multiple heat exchanger arrangements, simplifying incorporation of the heat exchange structure in vehicles such as aircraft.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. A heat exchange structure, comprising:
   a primary heat exchange body with a first fluid channel fluidly separated from a second fluid channel by a barrier channel;
   an inlet manifold in fluid communication with the second fluid channel; and
   a secondary heat exchange body in fluid communication with the barrier channel, wherein the secondary heat exchange body is arranged within the inlet manifold and fluidly couples the barrier channel to an external environment outside the heat exchange structure;
   wherein the secondary heat exchange body has a conduit portion with a plurality of conduit turns, the conduit portion of the secondary heat exchange body arranged within the inlet manifold.

2. The heat exchange structure of claim 1, wherein the secondary heat exchange body has a vent fluidly coupling the barrier channel to the external environment.

3. The heat exchange structure of claim 1, wherein the secondary heat exchange body includes a header portion connected to the primary heat exchange body and fluidly coupling the barrier channel to the secondary heat exchange body.

4. The heat exchange structure of claim 1, wherein the barrier channel is unsealed with respect to the external environment and is in fluid communication with the external environment through a vent, and further comprising a collection tank in fluid communication with the barrier channel.

5. The heat exchange structure of claim 1, wherein the primary heat exchange body includes an outer wall portion bounding the first fluid channel, the first fluid channel having a plurality of first fluid channel segments.

6. The heat exchange structure of claim 1 connected to a gas turbine engine.

7. The heat exchange structure of claim 1, further comprising at least one of (a) a heat transfer enhancement feature connected to the secondary heat exchange body and thermally coupling the secondary heat exchange body to fluid traversing the inlet manifold, and (b) a leakage flow sensor arranged within the inlet manifold and in communication with the secondary heat exchange body.

8. A heat exchange structure, comprising:
a primary heat exchange body with a first fluid channel fluidly separated from a second fluid channel by a barrier channel;
an inlet manifold in fluid communication with the second fluid channel; and
a secondary heat exchange body in fluid communication with the barrier channel, wherein the secondary heat exchange body is arranged within the inlet manifold and fluidly couples the barrier channel to an external environment outside the heat exchange structure;
wherein the primary heat exchange body includes an outer wall portion bounding the first fluid channel, the first fluid channel having a plurality of first fluid channel segments;
wherein the primary heat exchange body includes an intermediate wall portion bounding the barrier channel, the barrier channel having a plurality of barrier channel segments interleaved among the plurality of first fluid channel segments.

9. A heat exchange structure, comprising:
a primary heat exchange body with a first fluid channel fluidly separated from a second fluid channel by a barrier channel;
an inlet manifold in fluid communication with the second fluid channel; and
a secondary heat exchange body in fluid communication with the barrier channel, wherein the secondary heat exchange body is arranged within the inlet manifold and fluidly couples the barrier channel to an external environment outside the heat exchange structure;
wherein the primary heat exchange body includes an outer wall portion bounding the first fluid channel, the first fluid channel having a plurality of first fluid channel segments;
wherein the primary heat exchange body includes an inner wall portion bounding the barrier channel and the second fluid channel, the second fluid channel having a plurality of second fluid channel segments interleaved among the plurality of first fluid channel segments and thermally coupled to the first fluid channel by the barrier channel.

10. A heat exchange method, comprising:
at a heat exchange structure as recited in claim 1,
flowing a hot fluid flow through the first fluid channel;
receiving a cold fluid flow at the inlet manifold;
cooling the secondary heat exchange body with the cold fluid flow;
flowing the cold fluid flow to the second fluid channel; and
communicating heat from the hot fluid flow to the cold fluid flow through the barrier channel.

11. The heat exchange method of claim 10, further comprising:
leaking a hot leakage flow that leaks from the first fluid channel from the first fluid channel to the barrier channel;
cooling the hot leakage flow with the secondary heat exchange body; and
venting the cooled leakage flow to the external environment through the secondary heat exchange body.

12. The heat exchange method of claim 10, wherein the hot fluid flow includes fuel having a temperature greater than an auto-ignition temperature of the fuel, wherein the cold fluid flow includes an oxidizer, and wherein the barrier channel and an interior of the secondary heat exchange body are maintained at ambient pressure.

* * * * *